United States Patent
Ahn et al.

(10) Patent No.: US 8,223,457 B2
(45) Date of Patent: Jul. 17, 2012

(54) NANOMETER SCALE MAGNETIZATION

(75) Inventors: Doyeol Ahn, Seoul (KR); Hyung Kwon Kim, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 0 days.

(21) Appl. No.: 13/185,270

(22) Filed: Jul. 18, 2011

(65) Prior Publication Data

US 2011/0273799 A1    Nov. 10, 2011

Related U.S. Application Data

(63) Continuation of application No. 12/200,737, filed on Aug. 28, 2008, now Pat. No. 8,004,793.

(51) Int. Cl.
    *G11B 5/127*    (2006.01)
(52) U.S. Cl. .................................. 360/125.02
(58) Field of Classification Search .......... None
    See application file for complete search history.

(56) References Cited

U.S. PATENT DOCUMENTS

| | | | |
|---|---|---|---|
| 5,883,760 | A | 3/1999 | Yamada et al. |
| 6,236,538 | B1 | 5/2001 | Yamada et al. |
| 2005/0231855 | A1* | 10/2005 | Tran .......................... 360/324.1 |
| 2007/0188920 | A1* | 8/2007 | Choi et al. .................... 360/126 |
| 2010/0039107 | A1 | 2/2010 | Ahn et al. |

OTHER PUBLICATIONS

Kim et al., "Faradays' Induction in Nano-Transformers", Nanotechnology Materials and Devices Conference, 2006. IEEE, vol. 1, pp. 120-121 (Oct. 2006).

Kim et al., "Magnetic capture of a single magnetic nanoparticle using nanoelectromagnets", J. Appl. Phys. 98, 104307, 4 pages (2005).

Kim et al., "Faraday's Induction Experiment in Nano-Transformers", IEEE Transactions on Nanotechnology, vol. 7, No. 2, pp. 120-123 (Mar. 2008).

U.S. Appl. No. 12/200,737, mail date, May 4, 2011, Notice of Allowance.

Jun Y.-W., et al., "Nanoscale size effect of magnetic nanocrystals and their utilization for cancer diagnosis via magnetic resonance imaging," Journal of the American Chemical Society, vol. 127, Issue: 16, (2005), 5732-5733 (1 page).

* cited by examiner

*Primary Examiner* — Mark Blouin
(74) *Attorney, Agent, or Firm* — Workman Nydegger

(57) ABSTRACT

Magnetic heads for perpendicular magnetic recording on magnetic recording media are provided.

20 Claims, 5 Drawing Sheets

NANOMETER SCALE MAGNETIZATION

CROSS-REFERENCE TO RELATED APPLICATIONS

This application is a continuation of U.S. patent application Ser. No. 12/200,737, filed Aug. 28, 2008, which is incorporated herein by reference in its entirety.

BACKGROUND

Background and Relevant Art

Interest in magnetic recording technology, including hard disk drive technology, has increased, particularly in efforts to dramatically increase data storage density. Longitudinal magnetic recording, which typically involves magnetization made in a parallel direction of a recording track, has been the dominant form of magnetic recording in commercial recording apparatuses for decades. One problem with magnetic recording is that, as the dimensions of bit size in a recording medium continue to be reduced, the magnetization for a data signal becomes more vulnerable to being lost due to thermal fluctuation. Recently, perpendicular magnetic recording, which involves magnetization made in the perpendicular direction of a recording medium, has received consideration as a possible solution for addressing the problems associated with magnetic recording, including the detrimental effects of thermal fluctuation.

However, traditional perpendicular magnetic recording is not a practical solution. That is because traditional perpendicular magnetic recording employs the use of a thin film magnetic head to perpendicularly magnetize a recording medium, and magnetic detecting devices such as giant magnetoresistive (GMR) sensors and Hall sensors are utilized to read the magnetized data.

BRIEF SUMMARY

The present disclosure provides magnetic read/write heads and corresponding methods for perpendicular magnetic recording therewith. In one embodiment, by way of non-limiting example, a magnetic head includes a first nanometer scale transformer having a first circuit, a second circuit, and a coupling area configured for magnetic induction coupling between the first circuit and the second circuit.

In another embodiment, a magnetic head includes a plurality of nanometer scale transformers, each of the nanometer scale transformers having a first circuit, a second circuit, and a coupling area configured for magnetic inducting coupling between the first and the second circuit, wherein each of the plurality of nanometer scale transformers are configured to serve as one of a read magnetic head and a write magnetic head.

In another embodiment, a method for writing data on a magnetic recording medium includes supplying a DC current to a magnetic head, the magnetic head including a nanometer scale transformer having a first circuit, a second circuit, and a coupling area configured for magnetic induction coupling between the first circuit and the second circuit, and allowing a magnetic field from the magnetic head to magnetize a bit area of the magnetic recording medium in accordance with data signals.

In another embodiment, a method for reading data from a magnetic recording medium includes supplying an AC current to a magnetic head, the magnetic head having a nanometer scale transformer including a first circuit, a second circuit, and a coupling area configured for magnetic inducting coupling between the first circuit and the second circuit, and measuring an electromotive force (EMF) output from the nanometer scale transformer.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, this summary should not be construed or used to limit the claimed subject matter.

DETAILED DESCRIPTION

Figure 1:
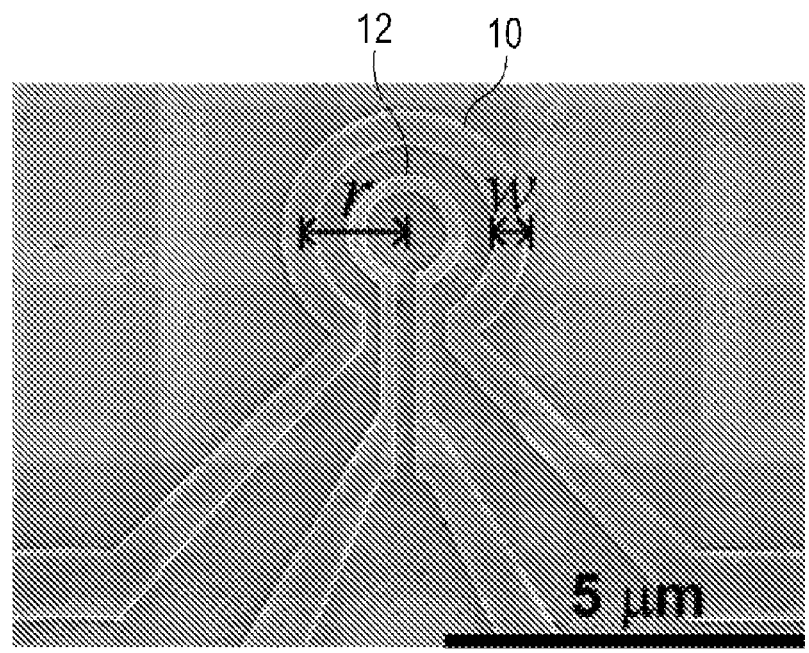
FIG. 1 shows an illustrative embodiment of a scanning electron microscopy (SEM) image of a nanometer scale transformer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

Figure 2:
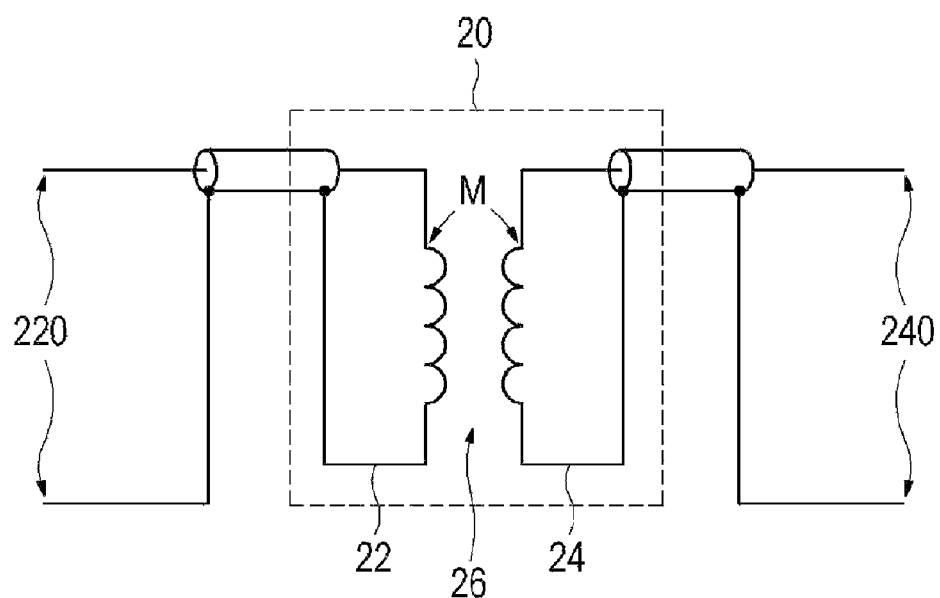
FIG. 2 shows a schematic diagram of an illustrative embodiment of a nanometer scale transformer connected to an external system via a terminal pair.

FIG. 1 shows an illustrative embodiment of a scanning electron microscopy (SEM) image of a nanometer scale transformer 20 (shown in FIG. 2). In some embodiments, nanometer scale transformer 20 may be fabricated, by way of example only, by using electron beam lithography and lift-off process on a SiO.sub.2 substrate. In other embodiments, any of a variety of known processes including, but not limited to, chemical vapor deposition (CVD), sputter deposition, spin coating, atomic layer deposition (ALD) and the like, may be adopted to fabricate nanometer scale transformer 20. As shown by way of example, nanometer scale transformer 20 may include an outer ring 10 and an inner ring 12, each having predetermined radii (r) and width (w). Each of rings 10 and 12 may correspond to a first circuit 22 or a second circuit 22 of nanometer scale transformer 20, and the area inside inner ring 12 may serve to cause magnetic induction. For example, the radius and the width of inner ring 12 may be about 300 nm and about 100 nm, respectively, and the radius and the width of the outer ring 10 may be about 700 nm and about 200 nm, respectively. Alternatively, inner ring 12 may have about a 700 nm radius and about a 200 nm width, and outer ring 10 may have about a 1400 nm radius and about a 500 nm width. The radius of inner ring 12 and outer ring 10 may range from several tens to several thousands of nanometers. The lower limit (i.e., several tens of nanometers) of the radius may be determined by the quantum size effect, and the upper limit (i.e. several thousands of nanometers) of the radius may be set by the nanometer scale limit. The width of inner ring 12 and outer ring 10 may be in the several hundreds of nanometers. Furthermore, outer and inner rings 10 and 12 may or may not be concentric. Outer and inner rings 10 and 12 may be made of various materials, including but not limited to Titanium (Ti), Gold (Au), and the like. In some embodiments, nanometer scale transformer 20 may have other suitable shapes of structures, including but not limited to oval, triangular, rectangular, polygon or square so long as the structure provides sufficient area for nano-scale magnetic induction coupling.

FIG. 2 shows a schematic diagram of an illustrative embodiment where nanometer scale transformer 20 is coupled to a first terminal pair 220 and a second terminal pair 240 for inputting signals into and/or outputting signals out of a transformer system. In this respect, nanometer scale transformer 20 includes a first circuit 22, a second circuit 24, and a coupling area 26. First circuit 22 and second circuit 24 may be coupled to first terminal pair 220 and second terminal pair 240, respectively. First terminal pair 220 and second terminal pair 240 may, by way of non-limiting example, be fabricated on a substrate with Au wires and be terminated with a contact pad. Any input, including but not limited to an AC current signal and a DC current signal, can be applied to either of first and second terminal pairs 220 and 240. The input is then coupled to one of first and second circuits 22 and 24 of nanometer scale transformer 20. Where one of first circuit 22 and second circuit 24 is provided with the input, magnetic flux (.PHI.) may be generated and passed through coupling area 26. The changes in the magnetic flux (.PHI.) at coupling area 26 may induce an EMF output to the other of first and second circuits 22 and 24 (whichever is not provided with the input current), in accordance with, for example, Faraday's induction law. EMF may be monitored at one of first and second terminal pairs 220 and 240 (whichever is not provided with the input current). In order to detect the EMF, a standard lock-in technique may be adopted. Aside from the magnetic coupling between first and second circuits 22 and 24, wires between first or second circuit 22 or 24 and first or second terminal pair 220 or 240 may be designed or shielded to prevent any other non-desirable magnetic coupling from interfering with the EMF output.

Nanometer scale transformer 20 may behave as a linear transformer, i.e., the induced EMF output is proportional to the time-varying magnetic flux (.PHI.) passing through coupling area 26 of nanometer scale transformer 20. The time-varying magnetic flux (.PHI.) is generated at coupling area 26 by the sinusoidal AC current supplied to one of first and second circuits 22 and 24, and induces EMF output at the another of first and second circuits 22 and 24.

Figure 3:
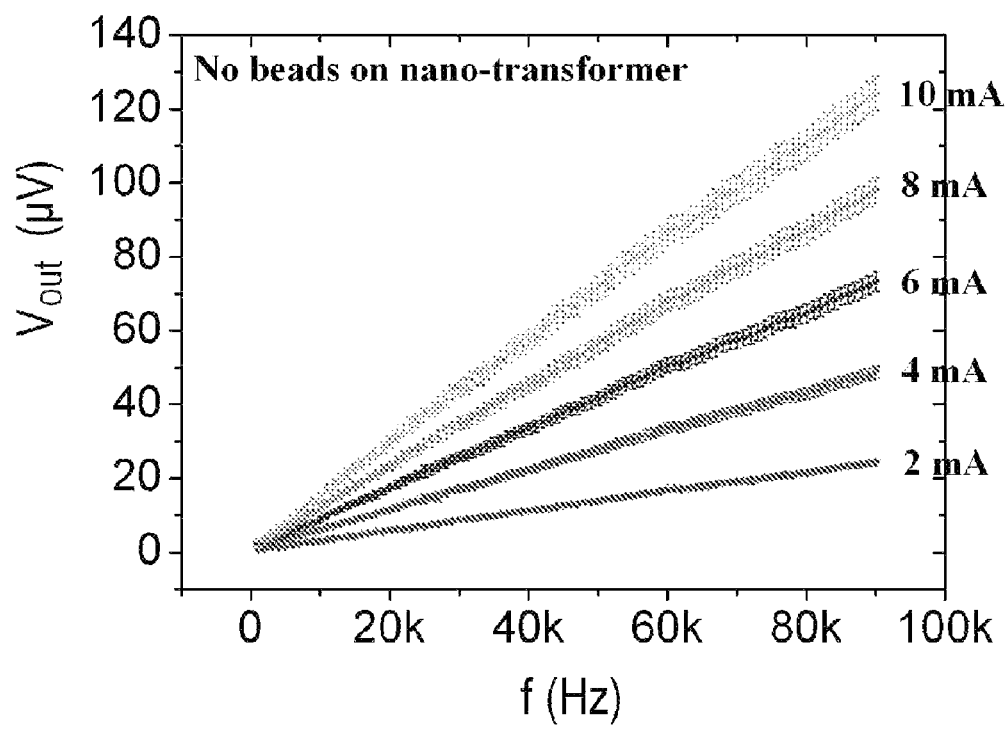
FIG. 3 shows a graph of an illustrative embodiment of a nanometer scale transformer behaving according to Faraday's Induction Law.

The foregoing will be made more evident from the following experimental results. FIG. 3 shows a graph of the induced EMF outputs resulting from the experiment using nanometer scale transformer 20. The experiment was performed without any magnetic material nearby. Nanometer scale transformer 20, as shown in FIG. 1, includes two metal concentric rings. In this experiment, the radius and the width of the inner ring are about 700 nm and about 200 nm, respectively, and the radius and the width of the outer ring are about 1400 nm and about 500 nm, respectively. However, the radius of inner and outer rings 10 and 12 may range from several tens to several thousands of nanometers. The lower limit (i.e., several tens of nanometers) of the radius may be determined by the quantum size effect, and the upper limit (i.e. several thousands of nanometers) of the radius may be set by the nanometer scale limit. The width of inner and outer rings 10 and 12 may be in the several hundreds of nanometers. A sinusoidal AC input current was applied via one of first and second terminal pairs 220 and 240 to outer ring 10 of the nanometer scale transformer 20 and the open-circuited EMF output was measured another of first and second terminal pairs 220 and 240 coupled to inner ring 12 by using a low noise lock-in amplifier. The AC input current through outer ring 10 generates a time-varying magnetic flux (.PHI.) through inner ring 12, and then the flux causes the EMF at both ends of inner ring 12. The input currents were about 2 to about 10 mA root-mean-square (rms) value with about 2 mA steps, and the frequencies were swept from about 1 to 90 kHz with about 1 kHz steps for each input current.

FIG. 3 shows an illustrative embodiment of a graph illustrating the output response as a function of the input current frequency for nanometer scale transformer 20. The filled circles and error bars on the graph represent the average value and the standard deviation of the induced EMF outputs acquired from a number of experiments using different nanometer scale transformers 20 with the same dimension, respectively. The resulting output response is almost linear with the input current frequency and with the input current magnitude. This indicates that nanometer scale transformer 20 behaves as a linear transformer. Measuring the open-circuited EMF output at inner ring 12, the mutual inductance of the transformer can be extracted from the following equation, $$V_{out} = j\omega M I_{in}$$

where $V_{out}$, $\omega$, M, and $I_{in}$ are the induced EMF output, the angular frequency of the input current, the mutual inductance, and the input current, respectively. The mutual inductance of the transformer is approximately 22 nH in view of the experimental results shown in FIG. 3.

Figure 4:
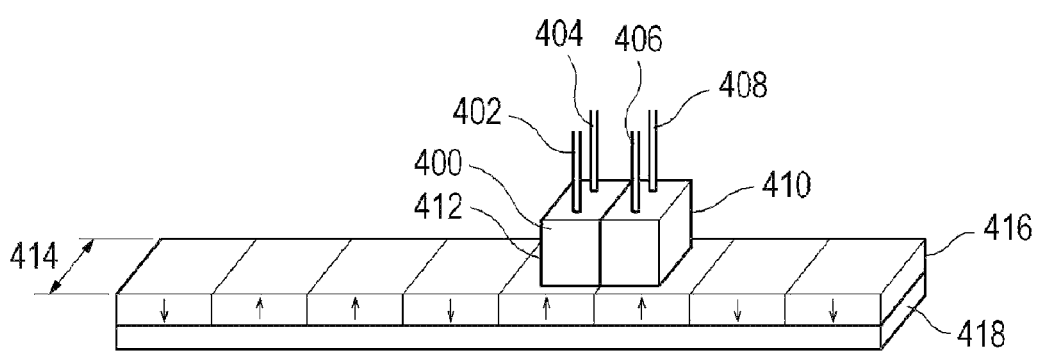
FIG. 4 shows a diagram of an illustrative embodiment of perpendicular magnetic recording using a magnetic read/write head with nanometer scale transformers.

FIG. 4 shows a schematic diagram of an illustrative embodiment of a perpendicular magnetic recording system. The magnetic recording system includes a magnetic read/write head 400 and a magnetic recording medium 416. Magnetic read/write head 400 may be separated into a first head portion 410 and a second head portion 412 for reading and writing magnetization on magnetic recording medium 416. Nanometer scale transformer 20 (as shown in FIG. 2) may be installed in each of first and second head portions 410 and 412. For example, nanometer scale transformer 20 may be disposed on a bottom side of first and second head portions 410 and 412 of magnetic read/write head 400 so as to face magnetic recording medium 416. Positioning nanometer scale transformer 20 substantially perpendicular to and coplanar with a surface of magnetic recording medium 416 allows the magnetic field generated by nanometer scale transformer 20 to effectively magnetize a bit area of magnetic recording medium 416 for writing data, and the magnetization stored on the magnetic recording medium 416 to reach the nanometer scale transformer 20 for reading data. As magnetization is accomplished by nanometer scale transformer 20, undesirable magnetic fields may adversely affect read/write operations of magnetic read/write head 400. To reduce and/or prevent such adverse effects, magnetic read/write head 400 may be made of insulating materials (not shown). For example, where nanometer scale transformer 20 is disposed on the bottom of first and second head portions 410 and 412, the remaining sides of first and second head portions 410 and 412 may be made of insulating materials. The insulating materials may be made from: TiO, $Ti_2O_3$, $Ti_3O_5$, $Ta_2O_5$, $Al_2O_3$, $WO_3SiO_2$, $Si_3N_4$, AlN or the like.

First head portion 410 of magnetic read/write head 400 includes a first pair of lines 406 and 408 coupled respectively to first circuit 22 and second circuit 24 of nanometer scale transformer 20 which is installed in first head portion 410. Second head portion 412 of magnetic read/write head 400 includes a second pair of lines 402 and 404 coupled respectively to first circuit 22 and second circuit 24 of nanometer scale transformer 20 which is installed in first head portion 410. DC current may be provided to second head portion 412 of magnetic read/write head 400. The DC current flows into one of first and second circuits 22 and 24 of nanometer scale transformer 20 installed in second head portion 412 via one of second pair of lines 402 and 404. One of first and second circuits 22 and 24 supplied with the DC current may produce magnetic fields to magnetize a bit area of magnetic recording medium 416 reflecting a data signal to be stored thereby. An AC current may be provided to first head portion 410 of magnetic read/write head 400. The AC current flows into one of first and second circuits 22 and 24 of nanometer scale transformer 20 installed in first head portion 410 via one of first pair of lines 406 and 408. One of first and second circuits 22 and 24 supplied with the AC current can induce EMF outputs at the other of first and second circuits 22 and 24 of nanometer scale transformer 20, which can then be measured through the other of first pair of lines 406 and 408. As magnetic recording medium 416 moves relative to magnetic read/write head 400, magnetization stored on each bit area causes magnetic flux (.PHI.) to enter into coupling area 26 of nanometer scale transformer 20, which changes magnitudes of EMF outputs. According to Faraday's Law, the EMF will be induced to oppose the changes in magnetic flux (.PHI.) so that one can tell the direction of magnetization stored on magnetic recording medium 416 by monitoring the changes in the EMF outputs.

In one embodiment, magnetic read/write head 400 may have a single head portion (not shown) installed with nanometer scale transformer 20, instead of having first and second head portions 410 and 412 as illustrated in FIG. 4. In this respect, magnetic read/write head 400 may read and a write perpendicular magnetization on magnetic recording medium 416 by providing an appropriate current to nanometer scale transformer 20. For example, the current may range from several mA (milliamps) to several tens of mA (milliamps). When a DC current is supplied to magnetic read/write head 400 having single head portion, nanometer scale transformer 20 may produce magnetic fields to magnetize a bit area of magnetic recording medium 416. When an AC current is supplied to magnetic read/write head 400 having single head portion, nanometer scale transformer 20 may induce EMF outputs at one of first and second circuits 22 and 24. The relative movements between magnetic recording medium 416 and magnetic read/write head 400 cause changes in magnetic flux (.PHI.) passing through coupling area 26 of nanometer scale transformer 20, thereby making it possible to detect changes in the EMF outputs of nanometer scale transformer 20, which reflect the magnetization stored on magnetic recording medium 416.

Figure 5:
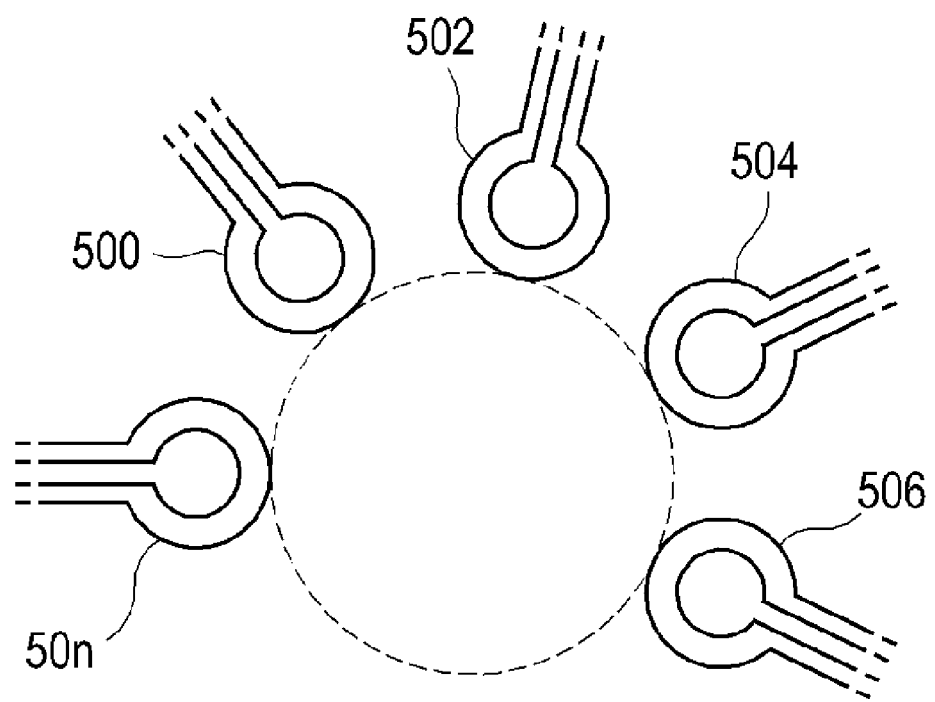
FIG. 5 shows a schematic diagram of an illustrative embodiment of a plurality of nanometer scale transformers collectively acting as a single magnetic read/write head.

In another embodiment, more than one nanometer scale transformer 20 (not shown) may be installed in a portion of magnetic read/write head 400. By way of example and not a limitation, as illustrated in FIG. 5, multiple nanometer scale transformers 500, 502, 504, 506, and 50n may be arranged along a virtual dotted circle, and collectively serve as one magnetic read/write head for reading and/or writing magnetic recording medium, for example magnetic recording medium 416.

Referring again to FIG. 4, magnetic recording medium 416 may be deposited on a disc with a track width 414 and include a hard magnetic layer (not shown) on which magnetization is made to store data. The hard magnetic layer can be made of a Co-alloy (e.g., CoCr or CoCr with one or more of Pt, Nb and Ta) or a magnetic multilayer, such as Co/Pt, Co/Pd, etc. To achieve good signal to noise ratio (SNR) and reduce interference between adjacent tracks or bit areas, a soft magnetic layer 418 may be incorporated adjacent the hard magnetic layer. The soft magnetic layer 418 may have high permeability, and, by way of example and not limitation, a composite material such as a FeSi alloy, a FeAl alloy, and a FeNi alloy, etc. may be used for the soft magnetic layer 418.

Figure 6:
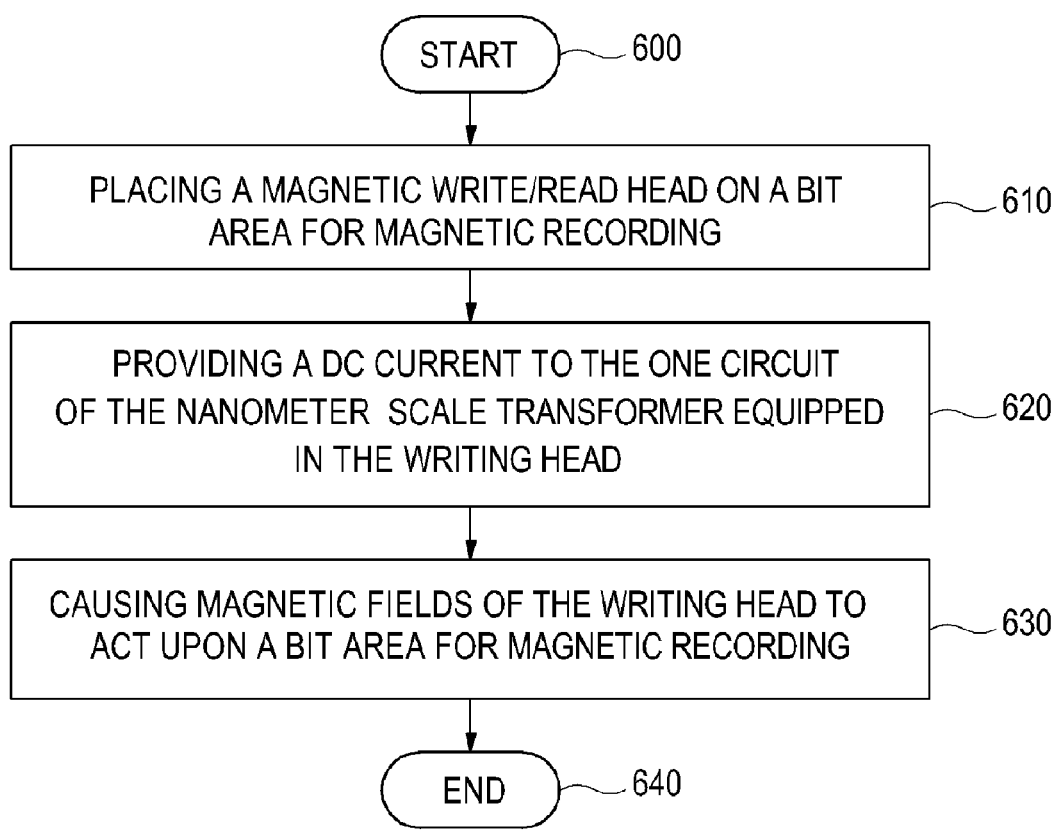
FIG. 6 shows a flowchart of an illustrative embodiment of a method for writing data on a magnetic medium by using a nanometer scale transformer equipped in a magnetic read/write head.

FIG. 6 is a flowchart of an illustrative embodiment of a method for writing data on magnetic recording medium 416 using nanometer scale transformer 20. The method for writing starts as block 600, and at block 610, a magnetic write/read head 400 may be placed on a bit area where outstanding data is to be stored. At block 620, DC current is provided to one of first and second circuits 22 and 24. At block 630, the nanometer scale transformer 20 supplied with the DC current may generate a magnetic field to magnetize a bit area on magnetic recording medium 416. According to a bit value to be stored on magnetic recording medium 416, a direction of the supplied DC current may be chosen to control perpendicular direction of magnetization on magnetic recording medium 416. After perpendicular magnetization on the magnetic recording medium 416, the method ends at block 640.

Figure 7:
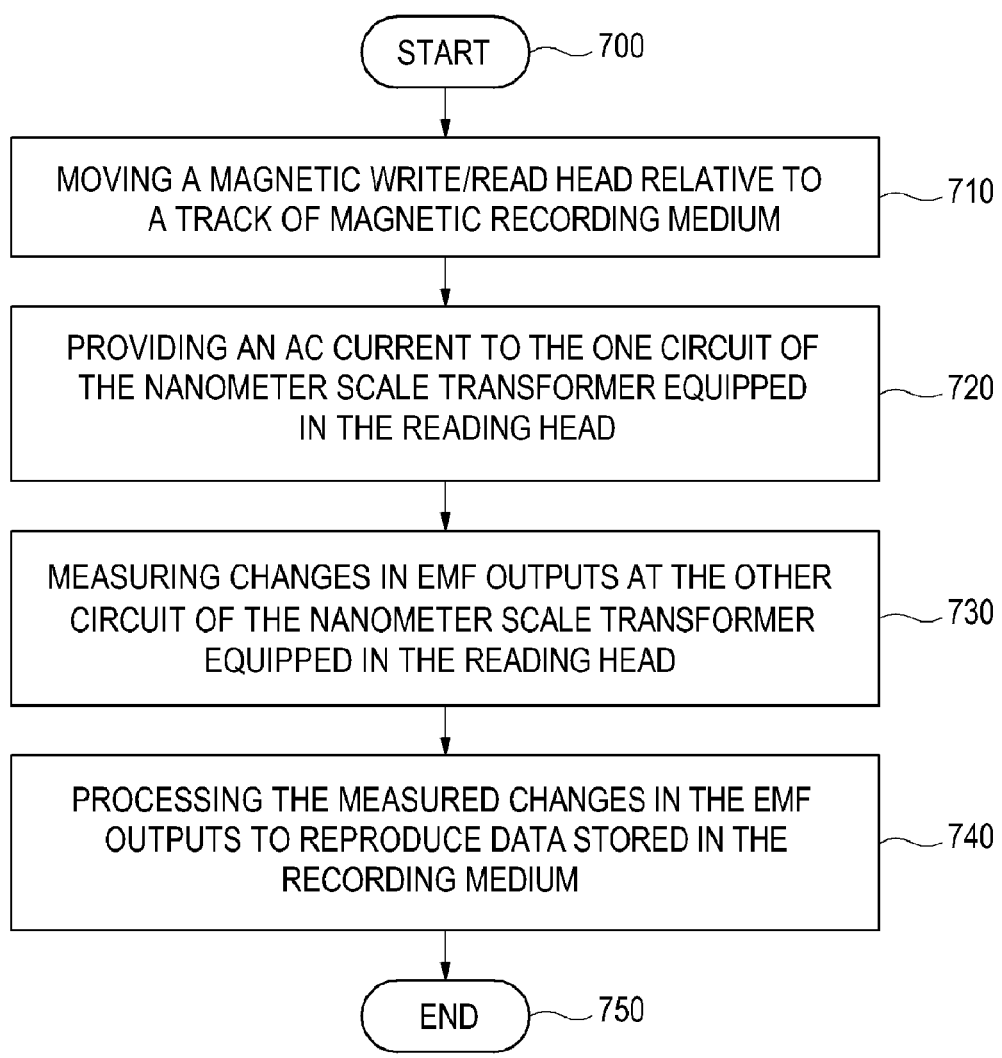
FIG. 7 shows a flowchart of an illustrative embodiment of a method for reading data on a magnetic medium by using a nanometer scale transformer equipped in a magnetic read/write head.

FIG. 7 is a flow chart of an illustrative embodiment of a method for reading back data stored on magnetic recording medium 416. The method starts at block 700 and proceeds to block 710 where a magnetic read/write head 400 may be moving relative to a track of magnetic recording medium 416. At block 720, a sinusoidal AC input current is supplied to one of first and second circuits 22 and 24 of nanometer scale transformer 20 to cause changes in the EMF output, as described above. At block 730, the EMF output is measured at the other circuit (another of first and second circuits 22 and 24) of the nanometer scale transformer 20. In one embodiment, the measurement may be conducted using a low-noise lock-in amplifier.

At block 740, data stored on magnetic recording medium 416 may be reproduced by processing the measured changes in the EMF outputs. In perpendicular magnetic recording, magnetization direction may be either "into" or "out-of" the surface of magnetic recording medium 416. As discussed above, nanometer scale transformer 20 behaves as a linear transformer, and thus the induced EMF output opposes the time-varying magnetic flux (.PHI.) passing through the coupling area 26. Assuming that as magnetic read/write head 400 enters a bit area of magnetic recording medium 416, the EMF output may increase because magnetization on the bit area can add magnetic flux (.PHI.) to coupling area 26. Furthermore, as magnetic read/write head 400 continues to move away from the bit area, the EMF output may decrease because magnetic flux (.PHI.) from magnetization on the bit area disappears. Therefore, when magnetic read/write head 400 passes through the bit area where the magnetization is produced in an "out-of" surface direction, the EMF output may first increase, and then decrease. When magnetization is produced in an "into" surface direction, the EMF output may first decrease, and then increase. Consequently, the pattern of changes in the EMF outputs may determine the direction of magnetization in corresponding bit areas, which may be interpreted as data stored in magnetic recording medium 416. The method then ends at block 750.

Those of ordinary skill will appreciate that the functions performed in the methods may be implemented in differing order, and that the outlined steps are provided as examples, and some of the steps may be optional, combined into fewer steps, or expanded to include additional steps without detracting from the essence of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A magnetic head for perpendicular magnetic recording on a magnetic recording medium, the magnetic head comprising:
   a first nanometer scale transformer comprising:
      a first circuit component that forms at least part of a first substantially ring-shaped structure having a first radius and a first width;
      a second circuit component that forms at least part of a second substantially ring-shaped structure having a second radius different than the first radius and a second width different than the first width; and
      a coupling area configured for magnetic induction coupling between the first circuit component and the second circuit component.

2. The magnetic head of claim 1, wherein the first substantially ring-shaped structure of the first circuit component has approximately a 300 nm radius and approximately a 100 nm width, or has approximately a 700 nm radius and approximately a 200 nm width.

3. The magnetic head of claim 1, wherein the second substantially ring-shaped structure for the second circuit component has approximately a 700 nm radius and approximately a 200 nm width, or has approximately a 1400 nm radius and approximately a 500 nm width.

4. The magnetic head of claim 1, wherein the substantially ring-shaped structures for the first and the second circuit components are substantially concentric.

5. The magnetic head of claim 1, wherein the coupling area is inside one of the substantially ring-shaped structures of the first or the second circuit components.

6. The magnetic head of claim 1, wherein the substantially ring-shaped structures of the first and the second circuit components are comprised of metal and a terminal pair configured to receive a DC current is connected to an outer substantially ring-shaped structure of the first and second substantially ring-shaped structures.

7. The magnetic head of claim 1, further comprising a first terminal pair connected to the first circuit component and/or a second terminal pair connected to the second circuit component.

8. The magnetic head of claim 7, further comprising an amplifier connected to one of the first and second terminal pairs.

9. The magnetic head of claim 1, further comprising a first and second terminal pair fabricated on a substrate with wires and terminated with a contact pad.

10. A magnetic head for perpendicular magnetic recording on a magnetic recording medium, the magnetic head comprising:
    a first nanometer scale transformer comprising:
       a first circuit;
       a second circuit;
       a coupling area configured for magnetic induction coupling between the first circuit and the second circuit; and
       an insulative substrate, wherein the first and the second circuits and the coupling area are fabricated on the substrate.

11. The magnetic head of claim 10, wherein the first and the second circuits are made of metals comprising Ti, Au, or combination thereof.

12. The magnetic head of claim 10, wherein each of the first and the second circuits are substantially ring-shaped structures, and each of the substantially ring-shaped structures has a different radius and width.

13. The magnetic head of claim 12, wherein the substantially ring-shaped structures for the first and the second circuits are substantially concentric.

14. The magnetic head of claim 12, wherein the coupling area is inside one of the substantially ring-shaped structures of the first and the second circuits.

15. The magnetic head of claim 10, wherein each of the first and the second circuits is substantially in the shape of one of: an oval, a triangle, a rectangle, a polygon or a square.

16. The magnetic head of claim 10, further comprising a first terminal pair connected to the first circuit and/or a second terminal pair connected to the second circuit.

17. The magnetic head of claim 10, further comprising a first and second terminal pair fabricated on the substrate with wires and terminated with a contact pad.

18. The magnetic head of claim 10, wherein the insulative substrate comprises $SiO_2$.

19. A magnetic head for perpendicular magnetic recording on a magnetic recording medium, the magnetic head comprising:
    a first nanometer scale transformer comprising:
       a first circuit component that forms at least part of a first substantially ring-shaped structure having a first radius and a first width;
       a second circuit component that forms at least part of a second substantially ring-shaped structure having a second radius different than the first radius and a second width different than the first width;
       a coupling area configured for magnetic induction coupling between the first circuit component and the second circuit component; and
       a $SiO_2$ containing substrate, wherein the first and the second circuits and the coupling area are fabricated on the substrate.

20. The magnetic head of claim 19, wherein the first substantially ring-shaped structure of the first circuit component has approximately a 300 nm radius and approximately a 100 nm width, or has approximately a 700 nm radius and approximately a 200 nm width and wherein the second substantially ring-shaped structure for the second circuit component has approximately a 700 nm radius and approximately a 200 nm width, or has approximately a 1400 nm radius and approximately a 500 nm width.

* * * * *